United States Patent [19]
Fuchs et al.

[11] Patent Number: 5,333,738
[45] Date of Patent: Aug. 2, 1994

[54] PROCESS AND INSTALLATION FOR RECOVERING VALUABLE MATERIALS, IN PARTICULAR FROM WASTE MATERIAL ON BUILDING SITES

[75] Inventors: Dieter Fuchs, Waldburg; Peter Strohhäcker, Ravensburg, both of Fed. Rep. of Germany

[73] Assignee: Maschinenfabrik Bezner GmbH & Co. KG, Ravensburg, Fed. Rep. of Germany

[21] Appl. No.: 741,468

[22] PCT Filed: Oct. 1, 1990

[86] PCT No.: PCT/DE90/00062
§ 371 Date: Oct. 4, 1991
§ 102(e) Date: Oct. 4, 1991

[87] PCT Pub. No.: WO90/08601
PCT Pub. Date: Aug. 9, 1990

[30] Foreign Application Priority Data
Feb. 4, 1989 [DE] Fed. Rep. of Germany ....... 3903325

[51] Int. Cl.[5] .............................. B07B 9/00
[52] U.S. Cl. ..................... 209/38; 209/314; 209/420; 209/630; 209/692; 209/702; 209/707; 209/930; 209/44.1; 209/44.4; 209/635; 209/925; 209/931; 209/933; 209/935
[58] Field of Search ............... 209/12, 38, 44.1, 234, 209/259, 313, 420, 421, 629, 630, 632–636, 930, 702, 933, 935, 314, 692, 707

[56] References Cited

U.S. PATENT DOCUMENTS

| | | | |
|---|---|---|---|
| 672,696 | 4/1901 | Bond | 209/314 X |
| 2,071,456 | 2/1937 | Dartnell | 209/259 X |
| 2,151,894 | 3/1939 | Cambessedes | 209/935 X |
| 4,242,197 | 12/1980 | Voelskow et al. | 209/12 X |
| 4,693,379 | 9/1987 | Stehle | 209/930 X |
| 4,760,925 | 8/1988 | Stehle et al. | 209/930 X |
| 4,763,793 | 8/1988 | Stehle et al. | 209/629 X |
| 4,855,039 | 8/1989 | Genev | 209/313 X |
| 5,101,977 | 4/1992 | Roman | 209/629 X |
| 5,116,486 | 5/1992 | Pederson | 209/930 X |

FOREIGN PATENT DOCUMENTS

| | | |
|---|---|---|
| 0173934 | 3/1986 | European Pat. Off. . |
| 0276750 | 8/1988 | European Pat. Off. . |
| 1184191 | 12/1964 | Fed. Rep. of Germany . |
| 3248493 | 7/1984 | Fed. Rep. of Germany . |
| 8503890 | 9/1985 | PCT Int'l Appl. . |
| 633200 | 11/1982 | Switzerland . |

*Primary Examiner*—D. Glenn Dayoan
*Assistant Examiner*—Tuan N. Nguyen
*Attorney, Agent, or Firm*—Spencer, Frank & Schneider

[57] ABSTRACT

A method is proposed for recovering valuable substances, particularly from construction site wastes and industrial trash as well as a system for implementing the method in which the essential sorters are disposed in a closed container which can be placed onto an elevated foundation. The foundation is formed by intersecting walls which simultaneously serve as partitions for various bunkers.

20 Claims, 3 Drawing Sheets

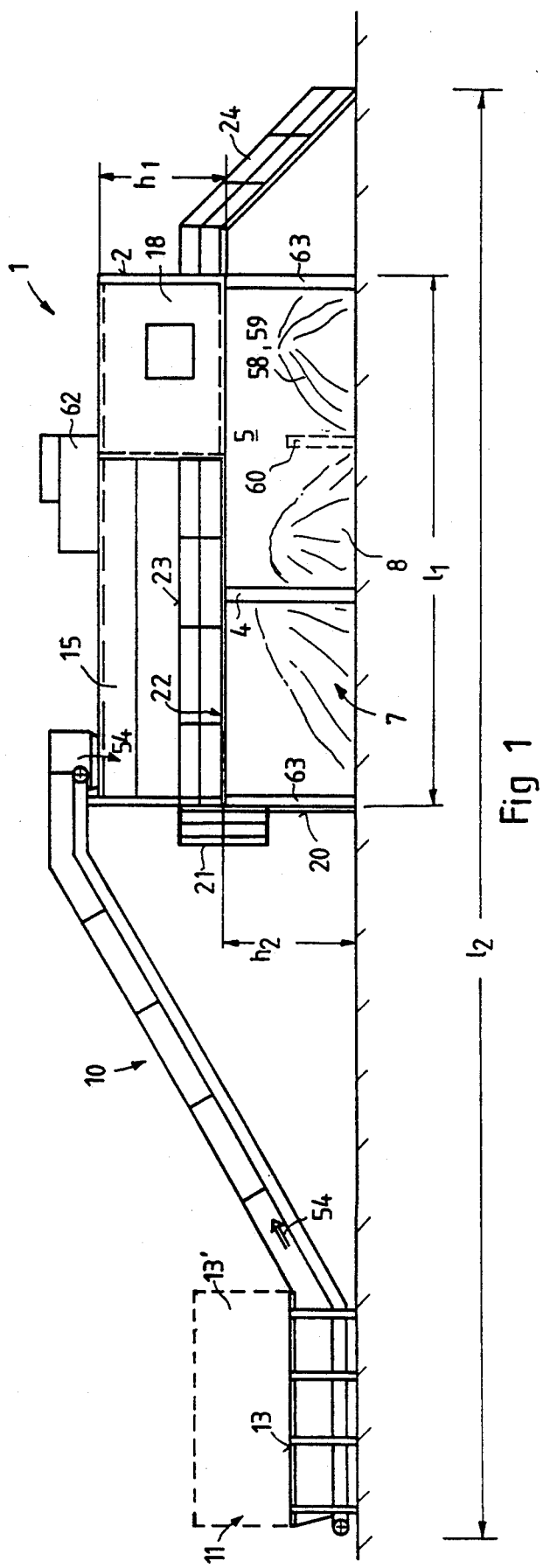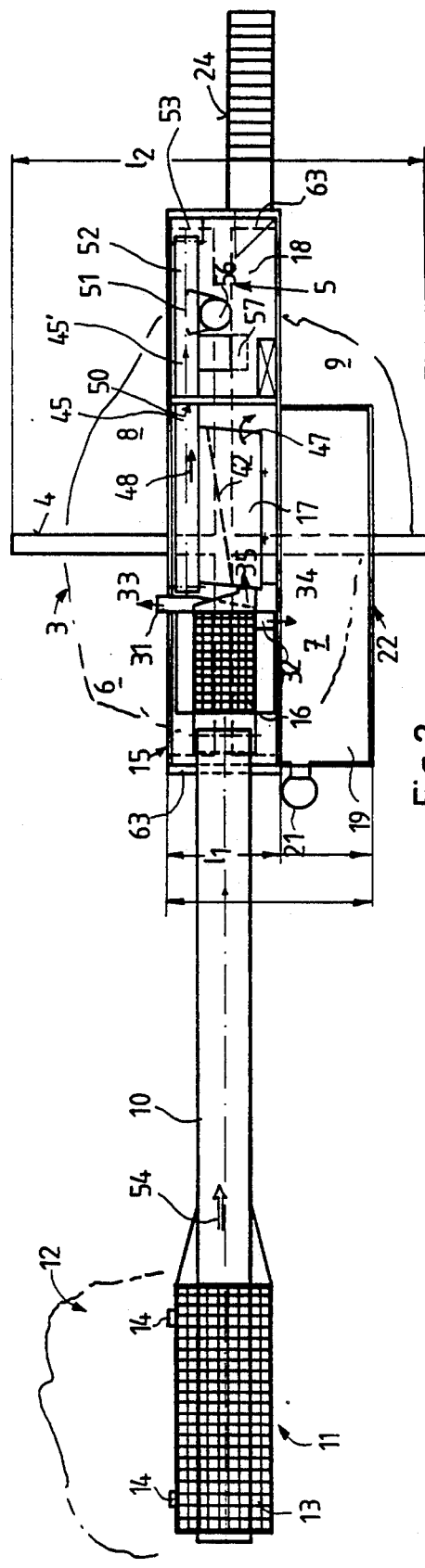
Fig 1
Fig 2

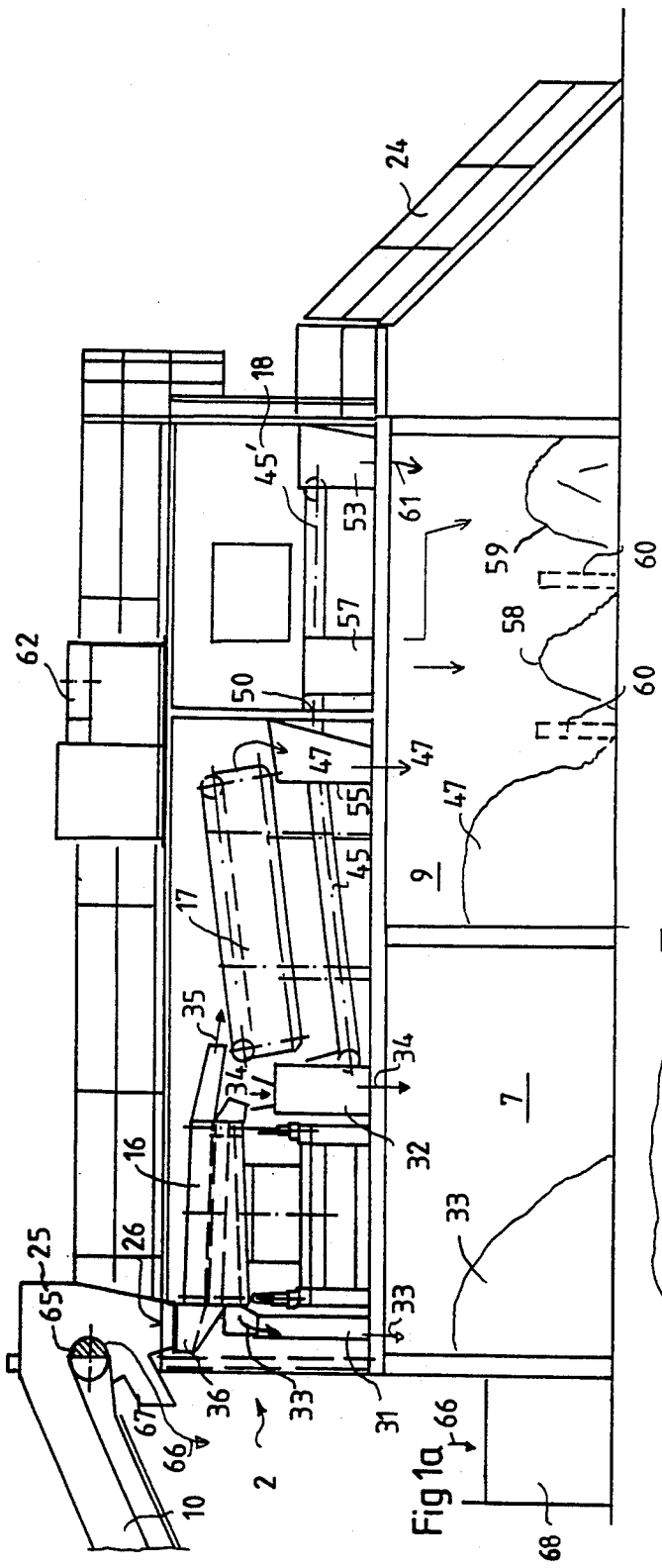
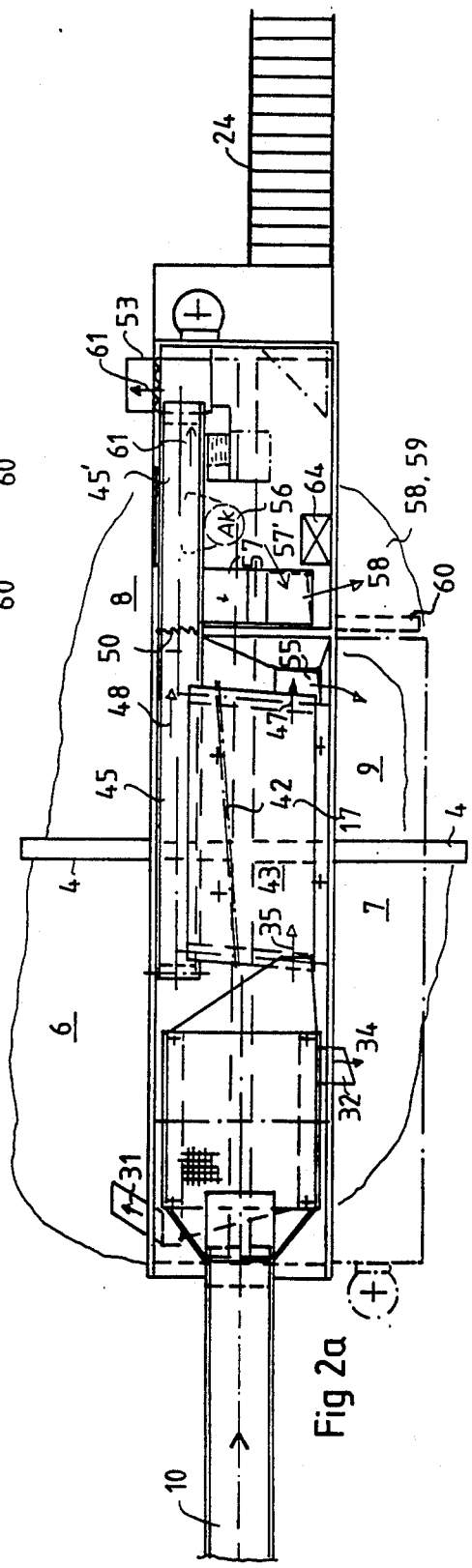
Fig 1a
Fig 2a

PROCESS AND INSTALLATION FOR RECOVERING VALUABLE MATERIALS, IN PARTICULAR FROM WASTE MATERIAL ON BUILDING SITES

BACKGROUND OF THE INVENTION

The invention relates to a method for the recovery of materials, particularly from construction site wastes, as well as to a system for implementing the method.

According to a reference in German Patent No. 3,248,493, the construction industry encounters, in addition to its classical demolition rubble, a waste material composed of the classical rubble of sand, soil, rocks and concrete remnants, as well as mixed rubble containing a large percentage of reusable substances such as wood, metal, textiles, paper, plastics or the like. This mixed rubble encountered during the reconstruction of buildings has in the past been sent in large quantities to trash dumps with the result that the dumps are filled up quickly. As stated in the cited patent, it is also desirable to separate such mixed rubble or mixed waste into its components in order to be able, in particular, to recycle the valuable materials and simultaneously reduce the amount stored in dumps. It would therefore be desirable to separate the mixed rubble from construction site wastes in such a way that it is divided into its essential components that can be recycled.

The above-cited U.S. Pat. No. 3,248,493 discloses, as a solution of this problem, a method as well as a system for implementing the method in which a plurality of process steps including automatic and manual sorting are connected in series. For example, the following assemblies are connected in series: preliminary screen, bunker, first handling station, shears, iron selector, first screening drum, non-ferrous selector, second handling station, second screening drum, etc. This plurality of individual, automatic or manual processing stations are connected with one another by means of conveyor belts. The final fractions obtained at the end are then generally again transported by means of conveyor belts to separate bunkers or onto a stockpile.

Such systems are spread out over a very large area, with the connection between the individual processing stations being effected by means of conveyor belts. Such systems are therefore feasible to erect only at an exposed location since they usually also involve a considerable stress on the environment, particularly with respect to noise and dust. The construction site wastes must therefore often be transported over long distances to these special systems, which also involves costs and effort. Moreover, the generally employed conveyor belts to connect the individual processing stations are very expensive and susceptible to damage from such complicated construction site wastes. The final fractions are then transported by means of additional conveyors to stockpiles or in containers.

SUMMARY OF THE INVENTION

The invention is based on the object of creating a method and a system for implementing the method which, in principle, also performs a separation of the waste components into the individual valuable materials and whose system is very simple, not very susceptible to malfunction and of flexible configuration. In particular, the method and the system should be usable so that mobile, that is, location independent, processing of such waste materials is possible with the least expenditures. It is to involve the smallest number of susceptible conveyor belts or transporting belts.

The above and other objects are accomplished according to the invention by the provision of a method for recovering valuable materials from construction site wastes or industrial trash, including:

prescreening a waste and valuable substance mixture using a coarse screening device, the coarse screening device removing large items over a predetermined size from the substance mixture;

feeding the substance mixture by way of an ascending conveyor into an elevated, transportable container, the container resting on a transportable foundation of at least two vertically intersecting walls forming at least four chambers underneath the container;

separating the valuable substances from the waste within the container using at least one sorting device including a screening machine equipped with plural screens arranged sequentially in the direction of the feed of the substance mixture, each screen separating by size a fraction of the substance mixture;

throwing each fraction into a respective chamber for temporary storage;

feeding the remaining substance mixture to subsequent processing station; and recovering the valuable substances from the chambers.

The invention is based on the realization that the sorting tasks are essentially solved by a system concept in which they are combined in a transportable container. In such a container, known sorting such as sorting machines may be arranged in enclosed areas, with stress on the environment in the form of noise or dust being avoided. A manual work station may also be provided that is spatially separated from the machine processing stations.

In order to avoid the use of conveyor belts for distributing the final fractions which are encountered in many types in such a sorting system that is assembled in a very tight space, the transportable container according to the invention is placed onto a star-shaped foundation, with the intersecting foundation walls forming the chambers for the individual fractions. Therefore, it is then only necessary to have essentially one conveyor belt in the form of an ascending conveyor belt since the further conveyance of the sorted or separated individual components or fractions is done simply in that they drop downward into the bunkers formed by the foundation cross.

Particularly advantageous is the arrangement of the foundation in the form of perpendicularly intersecting concrete walls or steel walls. These walls may be placed as finished components at any location onto a planar, solid surface and the container is placed on top. In this way, the entire system remains extremely mobile, that is, it can be set up and taken down in a short period of time at almost any suitable location. The connection of the intersecting walls can be effected by way of interlocking cuts at the cross-over point, so that the walls can be set up without additional fastening means.

The transportable container contains in its interior a known screening machine for screening out various fractions and a subsequently connected sloping sorter for separating certain substances. Partitioned off from this so-called machine area, is an additional sorting station at which the components not sorted out by the preceding machines are treated further. This area may simultaneously serve as the control center for the machine area.

Another advantage is that a coarse screening device precedes the ascending conveyor so as to allow only waste material that does not exceed a certain size to reach the ascending conveyor. The coarse screen therefore prevents particularly bulky and large goods from reaching the sorting system in the container. In the embodiment, this coarse screen is configured as a coarse screening machine whose upper grate can be pivoted upward from time to time in order to eject the retained coarse interfering substances on the side.

The ascending conveyor itself is preferably a plate belt equipped with iron plates as the supporting elements so as to constitute the most insensitive possible conveying system. It can be collapsed for transporting purposes. To keep environmental stresses at a minimum, the continuous conveyor may be encapsulated to prevent moisture from coming in from the outside and retain dust in the interior.

Preferably the container is equipped with an air-conditioning system and a dust removal system. In this way, the environment as well as the manual sorting station are protected as well as possible. The entire system may be operated by means of a mobile electric generator.

BRIEF DESCRIPTION OF THE DRAWINGS

An advantageous and suitable embodiment of the invention is illustrated in the drawing figures and will be described in greater detail in the description below. It is shown in:

FIG. 1, a side view of the system according to the invention for implementing the method according to the invention;

FIG. 1a, a detailed illustration of the container of FIG. 1;

FIG. 2, a top view of the system according to FIG. 1;

FIG. 2a, a detailed illustration of the container of FIG. 2;

DETAILED DESCRIPTION OF THE PREFERRED EMBODIMENT

Figure 3:
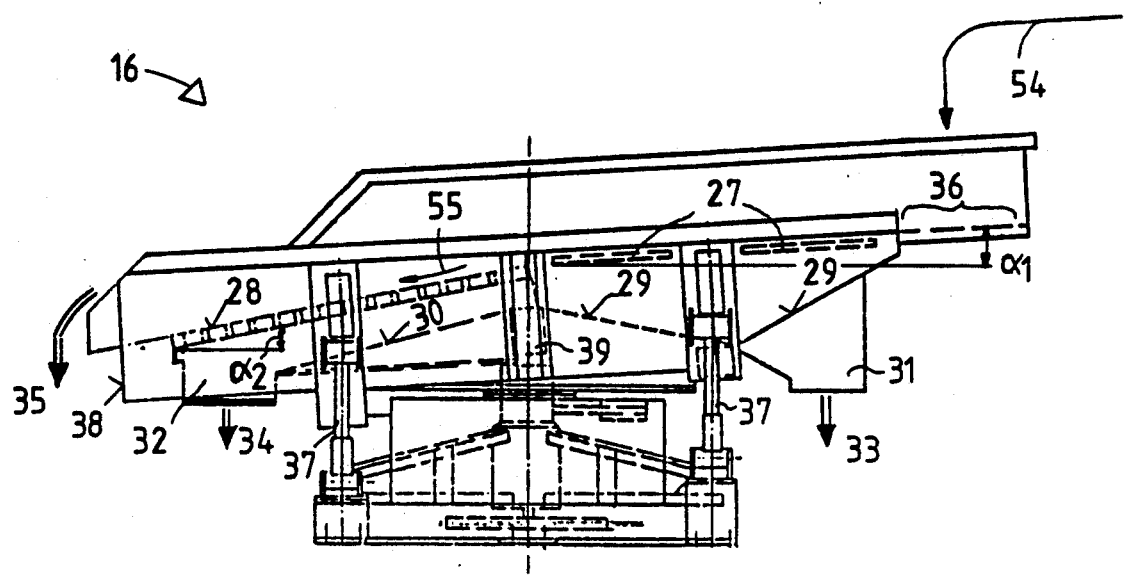
FIG. 3, an embodiment of a screening machine within the container.

The system concept shown in a side view in FIGS. 1 and 1a and in a top view in FIGS. 2 and 2a involves a mobile sorting system, particularly for sorting construction site wastes. For this purpose, the total system 1 includes a container 2 whose exterior dimensions are such that it can be transported on a road or on rails. For example, the collapsed container has a length $l_1 \approx 12.5$ m, a width $b_1 \approx 2.4$ m and a height $h_1 \approx 2.8$ m. With such a transportable container, the person in charge can determine the working location of the system and is able to quickly set up the system as well as transport it away again when the job is completed. The container is set up on a foundation 3 composed of two vertical, intersecting concrete walls 4, 5. The concrete walls have a height $h_2 \approx 3$ m and, by their arrangement which intersects in the center, form separate chambers or bunkers 6 to 9. The concrete wall 5 which lies in the longitudinal direction of the container has approximately the same length as the length $l_1$ of container 2. The concrete wall 4 which is perpendicular thereto has a length $l_2 \approx 10$ to 15 m. Instead of concrete walls, prefabricated steel walls may also be employed as supports or foundation the container. Additional supporting and transverse walls 63 having a width $b_1$ may be provided at the ends of concrete wall 5.

An ascending conveyor 10 charges the material to be sorted into the container which is placed onto the foundation. In order to ensure that the conveyor is not susceptible to damage, the ascending conveyor is configured as a plate belt conveyor that is equipped with iron plates and is encapsulated in order to prevent the penetration of moisture into the interior and the escape of dust and noise toward the exterior.

A coarse screen 11 precedes the ascending conveyor 10 and serves to preliminarily screen out coarse interfering substances and thus protect the subsequent machines and the process against over-sized pieces. The incoming construction site wastes are therefore initially charged onto coarse screen 11, with, for example, large boards, heavy iron beams or over-sized concrete pieces or remnants of masonry sections being held back. These coarse interfering substances 12 are removed by the coarse grate 13 of coarse screen 11 in that grate 13 is constructed so as to be pivoted upward about hinges 14. The coarse interfering substances 12 then come to lie next to coarse screen 11 and may be transported away from there. Grate 13 itself may also be subjected to a screening movement.

The waste material, when feed of the coarse interfering substances, then passes through grate 13 onto constant conveyor 10 which transports it upward to container 2.

As can be seen in FIGS. 1 and 1a as well as FIGS. 2 and 2a, container 2 is composed of a closed machine area 15 in which a screening machine 16 and a subsequently connected sloping sorter 17 are disposed. Separated from it, container 2 has an additional closed sorting area 18. Sorting area 18 is connected with machine area 15 only by way of an observation window or possibly by way of a door. Machine area 15 is normally closed and is encapsulated toward the exterior for reasons including containment of noise and dust. In order to access machine area 15, particularly for maintenance work, one side wall 19 is configured to be pivotal into a horizontal position and then forms a platform 22 in front of the machine area. A climbing ladder 20 equipped with a back protection basket 21 permits climbing onto the platform 22 formed by the pivoted-down side wall 19 and additionally equipped with a railing 23. Sorting area 18 is accessible by way of external stairs 24.

The mixed materials coming from the outwardly encapsulated ascending conveyor 10 are introduced from the top into container 2 by way of a charging device 25, travel through the encapsulated opening 26 in container 2 to screening machine 16. The end of ascending conveyor 10 is equipped with a magnetic tape drum 65 which transports magnetic components 66 through a discharge 67 into an additional container 68.

The screening machine 16 shown in greater detail in a basic side view in FIG. 3 is composed of a fine screen 27 and a screen 28 for medium-sized material so as to separate the charged-in components. Below these screening surfaces 27, 28, funnel-shaped slopes 29 and slides 30 are provided which conduct the screened-out material to outlets 31 and 32, respectively. The material screened out by fine screen 27 through outlet 31 is called the fine material 33 and the material screened out by screen 28 through outlet 32 is called medium-sized material 34. The even coarser material remaining on medium screen 28 is subjected to further processing as coarse material 35 at the outlet of the screening machine.

The uppermost fine screening bottom 27 is placed at an angle of about $\alpha_1 \approx 3°$ to $5°$ relative to the horizontal, the subsequent medium screening bottom 28 has an angle of inclination of $\alpha_2 10°$ to $15°$. Fine screen 27 extends over approximately the first half, medium screen 28 over approximately the second half of the entire screening machine 16, with an additional intake region 36 being provided.

The vibratory drive for screening machine 16 is provided by means of an external screen frame 38 mounted on rubber vibratory element 37, with an eccentric drive 39 being provided for causing screen frame 38 to perform horizontal circular vibrations with a large circular vibration diameter of about 100 mm. Such a drive is available, for example, for various purposes from Rosta-Werk AG, CH-5502 Hunzenschwil under the trade name "Rosta Kreuzgelenke Typ AK" [Rosta Cross-Joints Type AK]. A similar drive is disclosed in German Published Patent Application No. 1,184,191.

Figure 4:
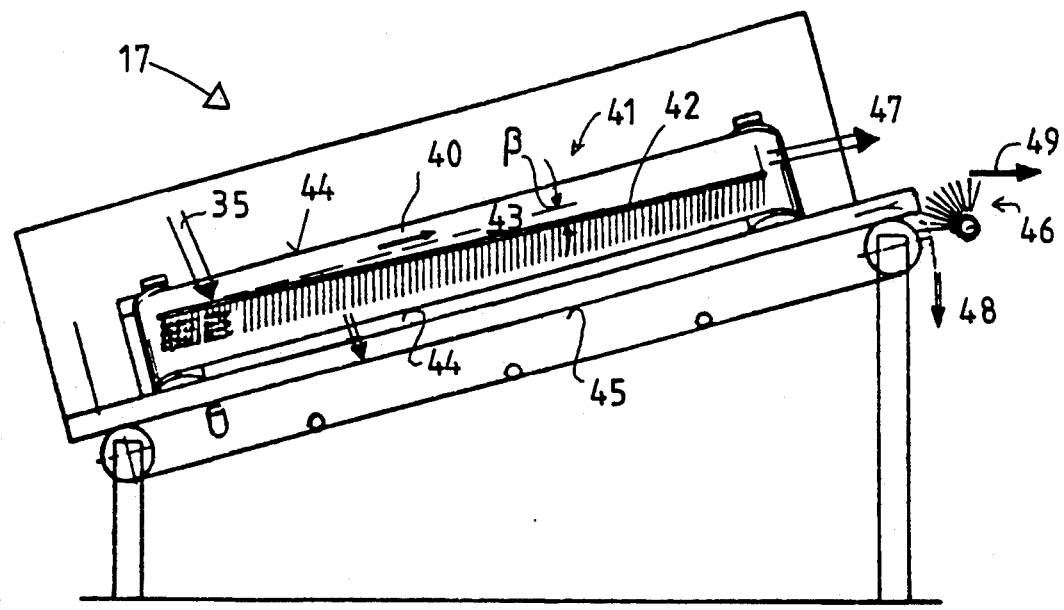
FIG. 4, an embodiment of a sloping sorter within the container of FIGS. 1 and 2.

According to the illustrations in FIG. 1a and in FIGS. 2 and 2a, screening machine 16 is followed by a sloping sorter 17 as shown in greater detail in FIG. 4. This sloping sorter is disclosed, in principle, in European Patent Application No. 0,123,825 by applicant. Reference is made expressly to the description of this machine in the earlier published application.

According to this sorting device 17 for sorting valuable materials out of, for example, industrial trash, a conveyor belt 41 is provided which ascends in the transporting direction 40 and which includes a catch curtain 42 arranged at an angle to the direction of movement of the conveyor belt, with the conveyor belt including a transporting plane 43 that descends or is sloped transversely to the direction of movement and can be caused to perform vibratory movements. The catch curtain 42 is arranged in transporting plane 43 at an angle $\beta$ to the longitudinal edge 44 of the conveyor belt. This edge extends parallel to the direction of movement of the conveyor belt. Below the lower longitudinal edge 44 of the sloping conveyor belt 41, there is provided a further, planar or trough-shaped conveyor belt 45 which preferably also ascends in the transporting direction. At the end of this conveyor belt, a rotating brush 46 may be provided for separating lighter plastic components.

By means of the sloping sorter, flat items remain lying on conveyor belt 43 or are held back by catch curtain 42. Heavy, three-dimensional material, however, due to the gravity of the slope of transporting plane 43, slides downwardly through curtain 42 onto the lower conveyor belt 45. The discharge of the flat material occurs at the end of the sloping transporting plane 43 as a fraction 47, the heavier, three-dimensional material is discharged as a fraction 48 at the end of conveying device 45. If a brush 46 is provided, a further fraction 49, for example for three-dimensional plastic pieces, may exist.

The catch curtain 43 of sloping sorter 17 may also be configured as a rotating catch curtain as disclosed, for example, in PCT application WO/03890.

Sloping sorter 17 is followed in the container by a closed sorting area 18, with conveyor belt 45, 45' projecting through a sluice opening 50 and leading to manual processing station 51. At the end of this variable speed conveyor belt section 52, a discharge chute 53 into bunker area 8 is provided.

The overall system according to the invention operates as follows:

Initially a loader places the incoming construction site wastes onto coarse screen 11 so as to remove the coarse interfering substances, in particular, large pieces such as iron rods, large pieces of wood, large plates or the like. The width of the screening machine for the processing of construction site wastes may, for example, be about $250 \times 300$ mm for this coarse screen. From time to time, coarse screen 13 is flipped over, resulting in a coarse fraction 12 that cannot be sorted in the system according to the invention. Wastes which pass through coarse screen 11 travel as fraction 54 over ascending conveyor 10 to charging device 25 which is equipped with magnetic separators 65–68 and through intake opening 26 in the intake region 36 of screening machine 16. By way of charging device 25 and its opening 26, ascending conveyor 10 is connected with container 2 in an encapsulated manner so that the container is hermetically sealed toward the exterior during operation. The fraction 54 supplied by way of the ascending conveyor travels through intake region 36 of screening machine 16 onto fine screen 27.

In the embodiment, a fine fraction 33 is discharged at that point. It has a grain size of, for example, $<12$ mm. This fine fraction is transported through outlet 31 into bunker 6.

The remainder fraction 55 is guided over medium screen 28 and produces a second or medium-sized fraction 34 which is discharged at outlet 32 and reaches bunker portion 7. Between bunker 7 and discharge opening 32, an additional post-treatment station may be provided which is able to screen out, by means of air, those components that are easily blown. Moreover, a percentage of medium sized material (fraction 34) passes through the medium screen 28; it has a grain size from, for example, $>12$ mm to a grain size of, for example, 50 mm.

The material that is unable to penetrate the medium screen 28 is transported as coarse material or fraction 35 to sloping sorter 17. Here, a separation takes place according to shape and weight; planar components, such as plates, paper, plastic, etc. remain lying on the planar transporting plane 43 and are discharged at the end as fraction 47 into bunker portion 9. A discharge chute 55 serves to bring this fraction to bunker 9.

Three-dimensional or rolling, particularly heavy items travel downward by gravity along the side of transporting plane 43, penetrate the stationary or rotating catch curtain 42 and reach a conveyor belt 45 therebelow. At the end of this conveyor belt 45, 45' for heavy, three-dimensional material, a rotating brush 49 may selectively be provided as shown in FIG. 4. This brush separates, if needed, lighter pieces of material from heavier stone pieces and thus forms an additional fraction 49.

Through a lock 50, conveyor belt 45 is conducted directly into manual sorting area 18. This part of the conveying device is marked 45'. Conveyor belt 45, 45' may be equipped to have a variable belt speed so as to adapt it to the working speed of an operator 56. The remainder stream (fraction 48) arranged on conveyor belt 45 is sorted manually by an operator 56 and is feed of still present interfering and residual substances. For example, any possibly still included metal pieces or the like will now be removed. These interfering and residual substances are thrown in by way of one or several waste chutes 57, 57' and form further remainder fractions 58, 59 in bunker 9. If necessary, small partitions 60 may be set up. The electrical installation is marked with the reference numeral 64.

The fraction 61 which remains on conveyor belt 45' travels into discharge chute 53 and from there into bunker portion 8. This remaining coarse fraction, for example, has a grain size of, for example, >50 mm.

Consequently, a fraction 33 having a size of about 0 to 12 mm is stored in bunker 6, a fraction 34 of a size of about 12 to 50 mm is stored in bunker 7, a fraction 47 of about 50 to 300 mm in the form of flat items is stored in bunker 9, and a fraction 61 of a grain size greater than 50 mm is stored in bunker 8 as heavy three-dimensional material. Bunkers 6, 7 and 8 are therefore designed essentially for sand and stone materials of varying grain sizes and bunker 9 for other remainders.

Container 2 is equipped with a device 62 for extracting, filtering out and air-conditioning machine area 15 as well as sorting area 18. Here, the suction device serves, in particular, to remove dust from the machine area, that is, a subatmospheric pressure is generated which prevents the dust from entering into work area 18. In addition machine area 15 and, in particular, sorting area 18 are air-conditioned and ventilated. The system concept keeps stress on the environment as low as possible. Side wall 19 is pivoted down on the side only if access to machine area 15 is necessary. Otherwise, the container remains sealed toward the exterior so that as little noise and dust as possible will be emitted.

The length of the overall system is $l_2 \approx 35$ m. Of course, the height $h_2$ of concrete walls 4, 5 depends on the desired height of the fractions to be piled up in bunkers 7 to 9. Generally a height $h_2 \approx 3$ m is sufficient for this purpose.

The invention is not limited to the described and illustrated embodiment. Rather, it also includes all expert modifications and features that do not have their own inventive content.

We claim:

1. Method of recovering valuable materials from construction site wastes or industrial trash, comprising the steps of:
   prescreening a waste and valuable substance mixture using a coarse screening device, said coarse screening device removing large items over a predetermined size from the substance mixture;
   feeding the substance mixture by way of an ascending conveyor into an elevated, transportable container, said container resting on a transportable foundation of at least two vertically intersecting walls forming at least four chambers underneath said container;
   arranging one of the at least two vertically intersecting walls in a longitudinal direction extending in the direction of the feed of the substance mixture, and arranging the other of the at least two vertically intersecting walls in a latitudinal direction, wherein at least two of said chambers are located on each side of the longitudinally arranged wall and at least two of said chambers are located on each side of the latitudinally arranged wall;
   separating the valuable substances from the waste within said container using at least one sorting device including a screening machine equipped with plural screens arranged sequentially in the direction of the feed of the substance mixture, each said screen separating by size a fraction of the substance mixture;
   throwing each said fraction into a respective chamber for temporary storage;
   feeding the remaining substance mixture to a subsequent processing station; and
   recovering the valuable substances from said chambers for subsequent recycling.

2. Method for recovering valuable materials from construction site wastes or industrial trash, comprising the steps of:
   feeding a waste and valuable substance mixture by way of an ascending conveyor into an elevated, transportable container resting on a transportable foundation of vertical walls forming a plurality of chambers underneath said container;
   separating the valuable substance into a plurality of fractions within said container using at least one sorting device including a sloping sorter, said sloping sorter having a sloped conveying device being tilted transversely to and ascending in the direction of the feed of the substance mixture and being caused to vibrate, said sloping sorter further including a retaining curtain arranged obliquely on said sloped conveying device whereby flat and light weight materials remain on said sloped conveying device to be fed as a fraction into a chamber, and rounded and heavy materials slide down said sloped conveying device in a direction of the tilt through said retaining curtain to be fed to a supplemental conveyor belt extending parallel to said sloped conveying device for further processing;
   separating interfering and remaining materials from the substance mixture using a manual sorting station, said manual sorting station being located within the container in an area separate from the sorting device; and
   recovering the valuable substances form said chambers for subsequent recycling.

3. Method according to claim 2 wherein the separating step includes providing the container with at least one of an air-conditioning system and a dust removal system.

4. Method according to claim 2 wherein the feeding step includes providing an end of the ascending conveyor with a magnetic tape drum for separating magnetic components from the substance mixture.

5. Method for recovering valuable materials from construction site wastes or industrial trash, comprising the steps of:
   prescreening a waste and valuable substance mixture using a coarse screening device;
   feeding the prescreened substance mixture by way of an ascending conveyor at a constant speed into an elevated, transportable container resting on a transportable foundation of vertical walls forming a plurality of chambers underneath said container;
   separating the prescreeend substance mixture into fractions using plural sorting devices including a screening machine and a sloping sorter, said screening machine being for separating and retaining material by predetermined size, the material larger than said predetermined size traveling to the sloping sorter, said sloping sorter having a sloped conveying device being tilted transversely to and ascending in the direction of the feed of the substance mixture and being caused to vibrate, said sloping sorter further including a retaining curtain arranged obliquely on said sloped conveying device whereby flat and light weight materials remain on said sloped conveying device to be fed as a fraction into a chamber, and rounded and heavy materials slide down said sloped conveying device in a direction of the tilt through said retaining curtain to be fed to a supplemental conveyor belt extending parallel to said sloped conveying device for processing using a manual sortion station.

6. Method according to claim 5, wherein the separating step includes providing the container with an air-conditioning system from the removal of dust.

7. Method according to claim 5, wherein the feeding step includes providing an end of the ascending conveyor with a magnetic tape drum for separating magnetic components from the substance mixture.

8. A system for separating valuable materials from construction site wastes or industrial trash, comprising:
   a prescreening device having a course mesh for prescreening out large items over a predetermined size from a substance mixture;
   an ascending conveyor for transporting the substance mixture from said prescreening device;
   an elevated sorting device for receiving the substance mixture from said ascending conveyor, said sorting device including a screening machine having plural screens arranged sequentially in the direction of the feed of the substance mixture, each said screen separating by size a fraction of the substance mixture, the remaining substance mixture being fed to a subsequent processing station;
   a transportable foundation having one vertical longitudinally arranged wall extending in the direction of the feed of the substance mixture and at least one vertical latitudinally arranged wall, said walls intersecting to form at least four chambers underneath said sorting device, at least two of said chambers being located on each side of said longitudinally arranged wall and at least two of said chambers being located on each side of said latitudinally arranged wall, said sorting device being disposed on said transportable foundation, each said fraction being subsequently thrown into a respective chamber for temporary storage and later recovery; and
   a transportable, closed container for housing said elevated sorting device.

9. A system according to claim 8, wherein the container is provided with at least one of an air-conditioning system and a dust removal system.

10. A system according to claim 8, and further comprising a magnetic tape drum for separating magnetic components from the substance mixture at an end of the ascending conveyor.

11. A system for separating valuable materials from construction site wastes or industrial trash, comprising:
   a prescreening device having a course mesh for prescreening out large items over a predetermined size from a substance mixture;
   an ascending conveyor for transporting the substance mixture from said prescreening device;
   an elevated sorting device for receiving the substance mixture from said ascending conveyor, said sorting device including a screening machine and a sloping sorter, said screening machine having plural screens arranged sequentially in the direction of the feed of the substance mixture, each said screen separating by size a fraction of the substance mixture, the remaining substance mixture being fed to a subsequent processing station, said sloping sorter having a sloped conveying device being tilted transversely to and ascending in the direction of the feed of the substance mixture, said sloping sorter further comprising vibrating means for vibrating said sloped conveying device, a retaining curtain arranged obliquely on said sloped conveying device whereby flat and light weight materials remain on said sloped conveying device to be fed as a fraction into a chamber, and rounded and heavy materials slide down said sloped conveying device in a direction of the tilt through said retaining curtain, and a supplemental conveyor belt extending parallel to said sloped conveying device for transporting the rounded and heavy materials for further processing;
   a transportable foundation having at least two vertically intersecting walls forming at least four chambers underneath said sorting device, said sorting device being disposed on said transportable foundation, each said fraction being subsequently thrown into a respective chamber for temporary storage and later recovery; and
   a transportable, closed container for housing said elevated sorting device.

12. A system according to claim 11, wherein the container is provided with an air-conditioning system for the removal of dust.

13. A system according to claim 11, wherein an end of the ascending conveyor is provided with a magnetic tape drum for separating magnetic components from the substance mixture.

14. A system for separating valuable materials from construction site wastes or industrial trash, comprising:
   a prescreening device having a course mesh for prescreening out large items over a predetermined size from a substance mixture;
   an ascending conveyor for transporting the substance mixture from said prescreening device;
   an elevated sorting device for receiving the substance mixture from said ascending conveyor, said sorting device including a screening machine having plural screens arranged sequentially in the direction of the feed of the substance mixture, each said screen separating by size a fraction of the substance mixture, the remaining substance mixture being fed to a subsequent processing station;
   a transportable foundation having at least two vertically intersecting walls forming at least four chambers underneath said sorting device, said sorting device being disposed on said transportable foundation, each said fraction being subsequently thrown into a respective chamber for temporary storage and later recovery; and
   a transportable, closed container for housing said elevated sorting device, said container including a manual sorting station for separating interfering and residual substances from the substance mixture, said manual sorting station being located within the container in an area separate from the sorting device.

15. A system according to claim 14, wherein the container is provided with an air-conditioning system for the removal of dust.

16. A system according to claim 14, wherein an end of the ascending conveyor is provided with a magnetic tape drum for separating magnetic components from the substance mixture.

17. A system for separating valuable materials from construction site wastes or industrial trash, comprising:
- a prescreening device having a course mesh for prescreening out large items over a predetermined size from a substance mixture;
- an ascending conveyor for transporting the substance mixture from said prescreening device;
- an elevated sorting device for receiving the substance mixture from said ascending conveyor, said sorting device including a screening machine followed by a sloping sorter and a manual sorting station, respectively, whereby the screening machine, said sloping sorter and said manual sorting station are arranged relative to the direction of the feed of the substance mixture, and wherein said screening machine has plural screens arranged sequentially in the direction of the feed of the substance mixture, each said screen separating by size a fraction of the substance mixture, the remaining substance mixture being fed to a subsequent processing station;
- a transportable foundation having at least two vertically intersecting walls forming at least four chambers underneath said sorting device, said sorting device being disposed on said transportable foundation, each said fraction being subsequently thrown into a respective chamber for temporary storage and later recovery; and
- a transportable, closed container for housing said elevated sorting device.

18. A system for separating valuable materials from construction site wastes or industrial trash, comprising:
- a prescreening device having a course mesh for prescreening out large items over a predetermined size from a substance mixture;
- an ascending plate belt conveyor for transporting the substance mixture from said prescreening device, said ascending conveyor having iron plates and being disassemblable for transporting purposes;
- enclosure means for encapsulating the ascending conveyor against moisture and the emission of noise and dust;
- a magnetic tape drum for separating magnetic components from the substance mixture at an upper end of the ascending conveyor; an elevated sorting device from receiving the substance mixture from said ascending conveyor, said sorting device including a screening screening machine having plural screens arranged sequentially in the direction of the feed of the substance mixture, each said screen separating by size a fraction of the substance mixture, the remaining substance mixture being fed to a subsequent processing station;
- a transportable foundation having at least two vertically intersecting walls forming at least four chambers underneath said sorting device, said sorting device being disposed on said transportable foundation, each said fraction being subsequently thrown into a respective chamber for temporary storage and later recovery; and
- a transportable, closed container for housing said elevated sorting device.

19. A system for separating valuable materials from construction site wastes or industrial trash, comprising:
- a prescreening device having a course mesh for prescreening out large items over a predetermined size from a substance mixture;
- an ascending conveyor for transporting the substance mixture from said prescreening device;
- a transportable container for receiving the substance mixture from said ascending conveyor, said container having plural sorting devices for separating the valuable substances into several fractions, said sorting devices including a screening machine having plural screens arranged sequentially in the direction of the feed of the substance mixture, and a sloping sorter for separating flat and three-dimensional materials, said screening machine and said sloping sorter being arranged in the direction of the feed, respectively;
- a transportable foundation having at least tow vertically intersecting walls forming plural chambers, said container being disposed on said transportable foundation;
- a supplemental conveyor for transporting the three-dimensional materials for further processing; and
- a manual sorting station for sorting the three-dimensional materials, said manual sorting station being located within said container in an area separate from said sorting devices.

20. A system according to claim 19, wherein the ascending conveyor is a plate belt conveyor having iron plates and being disassemblable for transporting purposes, and further comprising enclosure means for encapsulating the ascending conveyor against moisture and the emission of noise and dust, and a magnetic tape drum for separating magnetic components from the substance mixture at an upper end of the ascending conveyor.

* * * * *

UNITED STATES PATENT AND TRADEMARK OFFICE
CERTIFICATE OF CORRECTION

PATENT NO. : 5,333,738
DATED : August 2, 1994
INVENTOR(S) : Dieter Fuchs et al.

It is certified that error appears in the above-indentified patent and that said Letters Patent is hereby corrected as shown below:

On the title page:
Item 22: Change "PCT Filed: October 1, 1990" to read
--PCT Filed: February 1, 1990--.

Signed and Sealed this

Thirteenth Day of December, 1994

*Attest:*

BRUCE LEHMAN

*Attesting Officer*    *Commissioner of Patents and Trademarks*